United States Patent Office 3,594,429
Patented July 20, 1971

3,594,429
TRICHLOROETHYLENE PREPARED BY OXYCHLORINATION OF VINYLIDENE CHLORIDE
Albert Antonini, Paris, Claude Kaziz, La Courneuve, and Georges Wetroff, Le Thillay, France, assignors to Produits Chimiques Pechiney-Saint-Gobain, Paris, France
No Drawing. Filed May 20, 1968, Ser. No. 730,617
Claims priority, application France, May 19, 1967, 106,977
Int. Cl. C07c 17/06, 21/10
U.S. Cl. 260—654A                                    16 Claims

ABSTRACT OF THE DISCLOSURE

A process for preparation of trichloroethylene by oxychlorination of vinylidene chloride with a fluid bed catalyst.

---

This invention relates to a process for the oxychlorination of vinylidene chloride to produce trichloroethylene.

It is well known that oxychlorination of ethylene and of $C_2$ ethylenic chlorinated derivatives, in the presence of an appropriate catalyst, yields saturated chlorinated derivatives. In order to obtain significant proportions of $C_2$ ethylenic chlorinated derivatives, it has been necessary to raise the reaction temperature generally to above 365° C. However, the processes of the prior art are incapable of directly producing substantial amounts of trichloroethylene without simultaneous side reactions, such as combustion and partial oxidation.

This invention has for an object a new and improved process of gaseous phase oxychlorination, at operating temperatures below 360° C., directly to obtain trichloroethylene in high yield, without appreciable amounts of side reactions and partial oxidation taking place.

In accordance with the oxychlorination process of this invention, vinylidene chloride, hydrochloric acid and a molecular oxygen containing gas is passed as a gaseous phase, at a temperature within the range of 150° to 360° C., and preferably 260° to 300° C., through at least one reaction zone in the presence of a fluidized catalyst bed.

The desired results are achieved, in accordance with the practice of this invention, when the gaseous components are employed in the molar feed ratio of $HCl/CH_2=CCl_2$ within the range of 0.5 to 3.0 and preferably 0.9 to 1.4, and $O_2/CH_2=CCl_2$ within the range of 0.15 to 1.0 and preferably 0.5 to 0.65. The feed flow rate, when measured from the standpoint of vinylidene chloride, is within the range of 0.5 to 20 moles per hour per liter of catalyst and preferably 2 to 12 moles vinylidene chloride per hour per liter of catalyst.

The significance of the reaction temperature can be illustrated by the following: When the gaseous components are reacted for oxychlorination of vinylidene chloride at a temperature in excess of 300° C., the reaction product contains less trichloroethylene and more byproducts which are indicative of excessive amounts of undesirable side reactions. For instance, as illustrated in the examples hereinafter set forth, when the same ingredients are reacted in the same ratios under the same conditions at a temperature of 365° C., as compared to 300° C., the amount of trichloroethylene in the reaction product will be only 39.6 molar percent at 365° C. as compared to 77 molar percent at 300° C.

With the intent of limiting the formation of compounds other than trichloroethylene and 1,1,1,2-tetrachloroethane (the latter compound being capable of transformation to trichloroethylene), particularly in the formation of pentachloroethane and perchloroethylene, it is advantageous only partially to transform the vinylidene chloride involved, such as to limit the reaction during passage through the catalytic reaction zone to up to 80 molar percent of the vinylidene chloride made available for conversion. Untransformed vinylidene chloride from the effluent of the catalytic reaction zone can be recovered and recycled with the feed to the reaction zone.

When the molecular oxygen containing gas contains more than 20 molar percent of gases which are inert with respect to the reaction, such as $N_2$, $CO_2$ and CO, the untransformed vinylidene chloride can be separated from the effluent from the catalytic reaction zone by various well known means and preferably by cooling and then washing with an organic solvent and then distilling off the untransformed vinylidene chloride taken up by the solvent for recycling.

It is an advantageous embodiment of this invention to make use of oxygen which is practically pure or pure as the molecular oxygen containing reactant. In such event, the easily condensable products comprising trichloroethylene, perchloroethylene and 1,1,1,2-tetrachloroethane are partially or entirely separated from the effluent from the catalytic reaction zone by condensation upon cooling, while the uncondensed gas, which contains a part of the untransformed vinylidene chloride, is recirculated in whole or in part to the catalytic reaction zone.

In an alternate method for carrying out the process of this invention, 1,1,1,2-tetrachloroethane is introduced as an added component to the feed of reactants to the catalytic reaction zone in a molar ratio, based upon vinylidene chloride, which does not exceed 2.

This invention also has for its object a new catalytic system adapted for use in the oxychlorination of vinylidene chloride.

The catalyst used for carrying out the process is employed in the reaction zone in the fluidized state. It is constituted essentially of a catalytic agent deposited on a carrier having an average specific surface area greater than 1 $m.^2/g.$ and preferably greater than 10$m.^2/g.$ The average particle size of the carrier should be within the range of 20 to 400 microns and preferably 40 to 120 microns.

In the specification, the term "average specific surface area" is used to mean that, if a series of catalyst samples are taken from different points of the catalytic bed in order to determine the specific surface area, according to the B.E.T. method, the results will show a dispersion in which the extreme values will not deviate by more than about 25% from the average.

As the carrier for the catalytic agent, use can be made of one or more substances such as alumina, magnesia, graphite, activated carbon, silica, alimino-silicates, and preferably clays having the aforesaid characteristics. Good results are obtained with an attapulgite type clay which, for use in the oxychlorination reaction of this invention, has an average specific surface area within the range of 10 to 160 $m.^2/g.$ Very good results are obtained with a carrier consisting essentially of silica and magnesia having an average specific surface area within the range of 40 to 200 $m.^2/g.$ Such material exhibits excellent fluidization characteristics.

As the catalytic agent, use can be made of a material essentially constituted of at least one compound of the following list of elements, namely: alkali metals, alkaline earth metals, bismuth, cadmium, chromium, copper, cobalt, tin, iron, magnesium, manganese, nickel, platinum, rare earths, thorium, vanadium, zinc and zirconium.

In an advantageous embodiment of this invention, the oxychlorination reaction is carried out under a pressure within the range of 1 to 10 absolute bars and preferably below 8 absolute bars.

The following examples are given by way of illustration, but not by way of limitation of this invention:

EXAMPLES I TO IV

The oxychlorination of vinylidene chloride is carried out in a glass reactor having an internal diameter of 65 mm. and a height of 1000 mm. and which is heated externally by electrical resistance heaters. The lower portion of the tube is equipped with a reversed cone filled with 2 mm. glass beads for mixing the reactants and to diffuse the gases in the catalytic bed.

The height of the catalytic bed, at rest after fluidization, is 450 mm. The catalyst is prepared by impregnating an attapulgite type clay with an aqueous solution of

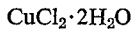

$$CuCl_2 \cdot 2H_2O$$

and KCl in amounts to provide the final content of copper and potassium cations in the dry catalyst of 8.2% and 4.8% by weight, respectively. The average specific surface area of the carrier, after the catalyst has been operated under normal running conditions for about a hundred hour, is about 80 m.²/g. The catalytic mass has a granular size ranging from 100 to 315 microns with 50% having a granular size less than 210 microns.

During the operation, the reactants of vinylidene chloride, air and gaseous hydrochloric acid are introduced under an absolute pressure of 1.05 bar to the lower part of the reversed cone and the reactor is heated by the external electric resistance heaters, regulating the temperature of the external wall of the tube by means of thermocouples placed between the external wall and the resistance heaters. The temperature of the catalytic bed is held constant and uniform at 260° C.±2° C. in Example I; 270° C.±2° C. in Example II; 280° C.±2° C. in Example III, and 300° C.±2° C. in Example IV.

The following Table I shows the results obtained:

TABLE I

| Example | I | II | III | IV |
|---|---|---|---|---|
| Feed rate flow of vinylidene chloride in moles/hr. and per liter of catalyst | 1.42 | 1.59 | 1.50 | 1.40 |
| Feed molar ratios of the reactants: | | | | |
| HCl/CH$_2$=CCl$_2$ | 1.36 | 1.34 | 1.30 | 1.31 |
| O$_2$/CH$_2$=CCl$_2$ | 0.54 | 0.51 | 0.54 | 0.56 |
| Total conversion rate of the reactants in molar percent of: | | | | |
| Vinylidene chloride | 83.7 | 92.0 | 94.4 | 95.6 |
| Hydrochloric acid | 91.8 | 92.7 | 92.2 | 92.8 |
| Conversion rate of vinylidene chloride into various products expressed in molar percent of: | | | | |
| Trichloroethylene | 48.0 | 64.9 | 75.9 | 77.6 |
| 1,1,1,2-tetrachloroethane | 27.4 | 18.5 | 7.4 | 2.8 |
| Pentachloroethane | 7.0 | 7.0 | 9.0 | 11.2 |
| Perchloroethylene | 0.2 | 0.5 | 0.5 | 2.2 |
| CO | | | 0.3 | 0.5 |
| CO$_2$ | 0.8 | 0.8 | 0.8 | 1.0 |
| Miscellaneous | 0.3 | 0.3 | 0.5 | 0.3 |

By way of comparison, the oxychlorination of vinylidene chloride was carried out in accordance with the procedural steps of Example IV except that the reaction temperature was raised to 365° C. and the following results were obtained:

Total conversion rate of reactants in molar percent of—
Vinylidene chloride _____ 66.5
Hydrochloric acid _____ 53.2

Conversion rate of vinylidene chloride into various products expresed into molar percent of—

Trichloroethylene _____ 39.6
1,1,1,2-tetrachloroethane _____ 0.2
Pentachloroethane _____ 0.1
Perchloroethylene _____ 12.3
CO _____ 2.7
CO$_2$ _____ 9.2
C$_1$ chlorinated derivatives _____ 2.0
Miscellaneous _____ 0.4

It will be seen that the yield of trichloroethylene is considerably lower than that obtained in Example IV and that the formation of perchloroethylene by-product is appreciably increased with respect to the results secured in Example IV.

EXAMPLES V TO VII

Following the procedure of Examples I to IV, using the same reactor and the same catalyst but operating at a temperature of 280° C. in Examples V and VI and 300° C. in Example VII, and using relatively pure oxygen instead of air, the following results were obtained, as set forth in Table II;

TABLE II

| Example | V | VI | VII |
|---|---|---|---|
| Feed flow rate of vinylidene chloride in mole percent and per liter of catalyst | 2.50 | 2.57 | 2.46 |
| Feed molar ratios of the reactants: | | | |
| HCl/vinylidene chloride | 1.35 | 1.21 | 1.34 |
| O$_2$/vinylidene chloride | 0.57 | 0.55 | 0.58 |
| Total conversion rate of the reactants into molar percent of: | | | |
| Vinylidene chloride | 94.3 | 91.9 | 95.6 |
| Hydrochloric acid | 90.9 | 95.2 | 91.0 |
| O$_2$ | 99.3 | 98.7 | 99.9 |
| Conversion rate of vinylidene chloride into various products expressed into molar percent of: | | | |
| Trichloroethylene | 73.2 | 73.6 | 76.7 |
| 1,1,1,2-tetrachloroethane | 4.9 | 4.7 | 1.1 |
| Pentachloroethane | 11.1 | 8.7 | 11.6 |
| Perchloroethylene | 2.8 | 2.3 | 3.4 |
| CO | 0.4 | 0.4 | 0.5 |
| CO$_2$ | 1.4 | 1.6 | 1.7 |
| Miscellaneous | 0.5 | 0.6 | 0.6 |

EXAMPLES VIII AND IX

The procedure of Examples V and VI was followed using a temperature of 280° C. and practically pure oxygen but the catalytic zone is fed intentionally with a deficiency of oxygen and gaseous hydrochloric acid in amounts to limit the total conversion rate of the vinylidene chloride to approximtaely 70%. In this manner, a low amount of pentachloroethane and perchloroethylene is obtained so that the converted vinylidene chloride is essentially transformed to trichloroethylene and 1,1,1,2-tetrachloroethane. The effluent gases from the catalytic reaction zone are washed with an organic solvent of low volatility such as ortho-dichlorobenzene, in order to recover therein by solution the untransformed vinylidene chloride which is returned to the reaction zone.

Table III gives the results of the reaction and indicates the yield of trichloroethylene and 1,1,1,2-tetrachloroethane of the total operation with respect to the vinylidene chloride involved, taking into consideration the recycling to the reaction zone of the vinylidene chloride which is recovered from the effluents.

TABLE III

| Example | VIII | IX |
|---|---|---|
| Feed flow rate of vinylidene chloride in mole/hr. and per liter of catalyst | 3.52 | 2.68 |
| Feed molar ratios of the reactants: | | |
| HCl/vinylidene chloride | 0.97 | 0.79 |
| O$_2$/vinylidene chloride | 0.42 | 0.38 |
| Total conversion rate of the reactants into molar percent of: | | |
| Vinylidene chloride | 76.6 | 68.9 |
| Hydrochloric acid | 92.8 | 96.2 |
| O$_2$ | 97.3 | 97.3 |
| Conversion rate of vinylidene chloride into various products expressed into molar percent of: | | |
| Trichloroethylene | 62.2 | 59.9 |
| 1,1,1,2-tetrachloroethane | 11.8 | 6.1 |
| Pentachlorethane | 1.0 | 0.9 |
| Perchloroethylene | 0.4 | 0.6 |
| CO | 0.3 | 0.3 |
| CO$_2$ | 0.8 | 1.0 |
| Miscellaneous | 0.1 | 0.1 |
| Yield of trichloroethylene and of 1,1,1,2-tetrachloroethane of the total operation | 95.6 | 94.6 |

It will be apparent from the foregoing that we have provided a new and improved process for producing trichloroethylene by oxychlorination of vinylidene chloride with a fluidized bed catalyst.

It will be understood that changes may be made in the details of formulation and operation without departing from the spirit of the invention, especially as defined in the following claims.

We claim:

1. A process for the preparation of trichloroethylene by oxychlorination of vinylidene chloride comprising the steps of passing a gaseous mixture of vinylidene chloride, a molecular oxygen-containing gas and hydrochloric acid in a molar ratio of $O_2/CH_2=CCl_2$ of 0.15 to 1.0 at a temperature within the range of 260° to 300° C. through a fluidized catalytic reaction zone containing an oxychlorination catalyst on a carrier having a surface area within the range of 10 to 200 m.²/g.

2. The process as claimed in claim 1 in which the gaseous reactants are passed through the catalytic reaction zone at a feed flow rate based upon vinylidene chloride within the range of 0.5 to 20 moles vinylidene chloride per hour per liter of catalyst.

3. The process as claimed in claim 1 in which the gaseous reactants are passed through the catalytic reaction zone at a feed flow rate based upon vinylidene chloride within the range of 2 to 12 moles vinylidene chloride per hour per liter of catalyst.

4. The process as claimed in claim 1 in which the molar feed ratio of hydrochloric acid to vinylidene chloride is within the range of 0.5 to 3.0.

5. The process as claimed in claim 1 in which the molar feed ratio of hydrochloric acid to vinylidene chloride is within the range of 0.9 to 1.4.

6. The process as claimed in claim 1 in which the molar feed ratio of oxygen to vinylidene chloride is within the range of 0.5 to 0.65.

7. The process as claimed in claim 1 in which the gaseous reactants are passed through the catalytic reaction zone at a feed flow rate based upon vinylidene chloride within the range of 0.5 to 20 moles per hour per liter of catalyst and in which the reactants are present in the feed in the molar feed ratio of hydrochloric acid to vinylidene chloride within the range of 0.5 to 3.0 and oxygen to vinylidene chloride within the range of 0.15 to 1.0.

8. The process as claimed in claim 1 in which the gaseous reactants are passed through the catalytic reaction zone at a feed flow rate based upon vinylidene chloride within the range of 2 to 9 moles per hour per liter of catalyst and in which the reactants are present in the feed in the molar feed ratio of hydrochloric acid to vinylidene chloride within the range of 0.9 to 1.4 and oxygen to vinylidene chloride within the range of 0.5 to 0.65.

9. The process as claimed in claim 1 in which the molecular oxygen containing gas is oxygen.

10. The process as claimed in claim 1 in which the vinylidene chloride conversion is limited to not more than 80 molar percent during passage through the catalytic reaction zone.

11. The process as claimed in claim 1 which includes the addition of 1,1,1,2-tetrachloroethane as a part of the feed gases in the molar ratio of less than 2 with respect to vinylidene chloride.

12. The process as claimed in claim 1 in which the carrier is an attapulgite clay.

13. The process as claimed in claim 1 in which the carrier consists essentially of silica and magnesia.

14. The process as claimed in claim 1 in which the gases in the catalytic reaction zone are under a pressure within the range of 1 to 10 absolute bars.

15. A process for the preparation of trichloroethylene by oxychlorination of vinylidene chloride comprising the steps of passing a gaseous mixture of vinylidene chloride, a molecular oxygen-containing gas and hydrochloric acid in a molar ratio of from 0.15 to 1.0 moles of oxygen and 0.5 to 3.0 moles of HCl per mole of vinylidene chloride at a temperature within the range of 260° to 300° C. through a fluidized catalytic reaction zone, wherein the catalyst is a mixture of copper chloride and potassium chloride on a carrier having a surface area in the range of 10 to 200 m.²/g. and being selected from the group consisting of attapulgite silica, magnesia and mixtures thereof, at a rate of 0.5 to 20 moles per hour per liter of catalyst.

16. A process as defined in claim 15 which includes the addition of 1,1,1,2-tetrachloroethane as a part of the feed gases in a molar ratio of less than 2 based upon the vinylidene chloride.

References Cited
UNITED STATES PATENTS

| | | | |
|---|---|---|---|
| 2,783,286 | 2/1957 | Reynolds | 260—659A |
| 2,374,923 | 5/1945 | Cass | 260—654(Oxy) |
| 3,345,422 | 10/1967 | Piester et al. | 260—654(Oxy)X |
| 3,454,661 | 7/1969 | Hornig et al. | 260—654(Oxy) |

LEON ZITVER, Primary Examiner

U.S. Cl. X.R.

260—658R